United States Patent
Lee

(10) Patent No.: US 10,266,103 B2
(45) Date of Patent: Apr. 23, 2019

(54) VEHICLE LIGHT GUIDE UNIT

(71) Applicant: Hyundai Mobis Co., Ltd., Seoul (KR)

(72) Inventor: Hyun Soo Lee, Seongnam-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 53 days.

(21) Appl. No.: 15/632,521

(22) Filed: Jun. 26, 2017

(65) Prior Publication Data

US 2018/0118090 A1     May 3, 2018

(30) Foreign Application Priority Data

Nov. 3, 2016     (KR) .................... 10-2016-0145803

(51) Int. Cl.
| | | |
|---|---|---|
| *B60Q 1/04* | (2006.01) | |
| *F21V 8/00* | (2006.01) | |
| *F21S 41/143* | (2018.01) | |
| *F21S 41/24* | (2018.01) | |
| *F21S 43/14* | (2018.01) | |
| *F21S 43/237* | (2018.01) | |
| *F21S 43/243* | (2018.01) | |

(Continued)

(52) U.S. Cl.
CPC .............. *B60Q 1/04* (2013.01); *F21S 41/143* (2018.01); *F21S 41/147* (2018.01); *F21S 41/24* (2018.01); *F21S 41/32* (2018.01); *F21S 43/00* (2018.01); *F21S 43/14* (2018.01); *F21S 43/236* (2018.01); *F21S 43/237* (2018.01); *F21S 43/243* (2018.01); *F21S 43/245* (2018.01); *F21S 43/247* (2018.01); *F21V 5/04* (2013.01); *G02B 6/0048* (2013.01); *G02B 6/0096* (2013.01)

(58) Field of Classification Search
CPC ...... B60Q 1/0011; B60Q 1/0041; B60Q 1/04; F21K 9/61; F21S 41/143; F21S 41/24; F21S 43/00; F21S 43/14; F21S 43/235; F21S 43/236; F21S 43/237; F21S 43/241; F21S 43/245; F21S 43/247; F21S 43/249; F21S 43/315; F21V 5/04; G02B 6/0001; G02B 6/0046; G02B 6/0048; G02B 6/0066; G02B 6/0073; G02B 6/0091; G02B 6/3841; G02B 19/0009; G02B 19/0014

See application file for complete search history.

(56) References Cited

U.S. PATENT DOCUMENTS

| | | | | |
|---|---|---|---|---|
| 6,929,390 | B2 * | 8/2005 | Amano | ............... F21S 48/215 |
| | | | | 362/245 |
| 7,182,497 | B2 * | 2/2007 | Lee | ................... F21V 7/0091 |
| | | | | 348/E9.027 |

(Continued)

FOREIGN PATENT DOCUMENTS

| | | |
|---|---|---|
| JP | 2012-079643 | 4/2012 |
| KR | 10-2016-0071248 | 6/2016 |

*Primary Examiner* — Hargobind S Sawhney
(74) *Attorney, Agent, or Firm* — H.C. Park & Associates, PLC

(57) ABSTRACT

A light guide unit configured to guide light incident from a light source which emits the light. The light guide unit includes: a light receiving portion configured to refract incident light from the light source; a guide portion which extends from the light receiving portion and guides incident light through the light receiving portion; and a light emitting portion formed in an opposite direction of the light receiving portion with respect to the guide portion, wherein the light guided by the guide portion is emitted toward the aspheric lens.

6 Claims, 5 Drawing Sheets

(51) Int. Cl.
*F21S 43/247* (2018.01)
*F21S 41/147* (2018.01)
*F21S 43/00* (2018.01)
*F21S 43/245* (2018.01)
*F21S 41/32* (2018.01)
*F21S 43/236* (2018.01)
*F21V 5/04* (2006.01)

(56) References Cited

U.S. PATENT DOCUMENTS

| | | | | |
|---|---|---|---|---|
| 7,419,287 B2* | 9/2008 | Gasquet | ................... | F21V 5/045 |
| | | | | 362/511 |
| 7,497,605 B1* | 3/2009 | Pan | ..................... | F21S 48/2218 |
| | | | | 362/487 |
| 7,942,565 B2* | 5/2011 | Klick | .................. | G02B 6/0018 |
| | | | | 362/555 |
| 9,261,254 B2* | 2/2016 | de Lamberterie | .... | F21S 41/141 |
| 2004/0208019 A1* | 10/2004 | Koizumi | .............. | B60Q 1/0041 |
| | | | | 362/545 |
| 2005/0063169 A1* | 3/2005 | Erber | ...................... | F21S 43/40 |
| | | | | 362/600 |
| 2006/0083013 A1* | 4/2006 | Wanninger | ........... | G02B 6/0028 |
| | | | | 362/509 |
| 2007/0008734 A1* | 1/2007 | Bogner | .................... | B60Q 1/04 |
| | | | | 362/509 |
| 2008/0030691 A1* | 2/2008 | Godo | ...................... | G02B 27/09 |
| | | | | 353/98 |
| 2008/0080201 A1* | 4/2008 | Specht | .................. | F21S 41/143 |
| | | | | 362/507 |
| 2009/0034278 A1* | 2/2009 | Tessnow | ................ | F21S 41/143 |
| | | | | 362/511 |
| 2015/0167913 A1 | 6/2015 | Stefanov et al. | | |
| 2015/0369434 A1 | 12/2015 | Baaijens et al. | | |

* cited by examiner

VEHICLE LIGHT GUIDE UNIT

CROSS-REFERENCE TO RELATED APPLICATION

This application claims priority from and the benefit of Korean Patent Application No. 10-2016-0145803, filed on Nov. 3, 2016, which is hereby incorporated by reference for all purposes as if set forth herein.

BACKGROUND

Field

Exemplary embodiments relate to a light guide unit, and more particularly, to a light guide unit configured to guide light incident from a light source which emits the light.

Discussion of the Background

Generally, a vehicle includes various vehicle lamps having a lighting function so that a driver easily recognizes objects around the vehicle and a signal function for notifying a traveling state of the vehicle to other vehicles or other pedestrians.

For example, there are apparatuses which directly emit light using lamps such as a headlight configured to emit light forward to secure visibility of a driver, a brake light which is turned on when a driver steps on a brake pedal, and a direction indicator lamp used when turning right or left. In addition, reflectors or the like, whose function is performed by reflecting light so that a vehicle of the driver can be easily recognized from the outside, are mounted on the front and rear of the vehicle.

Among the above lamps, the vehicle headlight has an essential function of emitting light in the same direction in which a vehicle travels so that visibility of a driver at night is secured.

Halogen lamps were widely conventionally used as vehicle light sources, but light emitting diode (LED) light sources, light guide units, and the like are currently being used as vehicle light sources.

An LED, which is a point light source configured to emit light with directivity from a side thereof, has an advantage in that design freedom is excellent because the LED is small and a method of arranging a plurality of devices can be used.

In addition, a light guide unit provides a path configured to uniformly scatter and diffuse light emitted by a light source, an LED light source is generally disposed therein, and incident light from the LED light source is converted into and emitted as surface light by the light guide unit.

Accordingly, the light guide unit can perform an indirect lighting effect without directly exposing the light source which emits light, and such an indirect lighting effect of the light guide unit serves to enhance aesthetics thereof.

According to a recent trend of a vehicle lamp unit which emphasizes aesthetic effects as well as lighting and signaling functions, the light guide unit has been applied to the vehicle lamp unit.

Conventionally, the light guide unit has a structure in which a light receiving portion is narrow and a light emitting portion is wide.

Accordingly, as the light emitting portion is widened, a light flux per unit area decreases, and thus light intensity decreases.

Conventionally, when a size of the light emitting portion is decreased to solve the above-described problem, a size of the light receiving portion is also decreased, and thus incident efficiency of light emitted by the LED is decreased.

That is, in a conventional light guide unit, intensity and efficiency of light emitted by the LED are decreased.

Accordingly, since the intensity and the efficiency of light are decreased, discriminability therebetween is lowered, and thus there is a problem in that lighting sensibility is also lowered.

Due to the above-described problem, when a light source which emits more intense light is formed, there is a problem in that costs and power consumption due to the light source are increased.

The above information disclosed in this Background section is only for enhancement of understanding of the background of the invention and, therefore, it may contain information that does not constitute prior art.

SUMMARY

Exemplary embodiments of the present invention provide a light guide unit capable of increasing intensity and efficiency of light emitted by a light source.

According to an aspect of the present invention, there is provided a vehicle light guide unit which projects light emitted from a light source and emits the light toward an aspheric lens including: a light receiving portion configured to refract incident light from the light source; a guide portion which extends from the light receiving portion and guides incident light through the light receiving portion; and a light emitting portion formed in an opposite direction of the light receiving portion with respect to the guide portion, wherein the light guided by the guide portion is emitted toward the aspheric lens.

The guide portion may include: a flat surface portion which extends from the light receiving portion toward the light emitting portion; and a lower surface portion which is formed in an opposite direction of the flat surface portion with respect to the light receiving portion and the light emitting portion and extends from the light receiving portion toward the light emitting portion.

The lower surface portion may include: a first inclined portion which obliquely extends from the light receiving portion toward the light emitting portion; a stepped portion which perpendicularly extends from an end portion of the first inclined portion; and a second inclined portion which obliquely extends from an end portion of the stepped portion toward the light emitting portion.

The guide portion may further include side surface portions which connect end portions of both sides of the flat surface portion and end portions of both sides of the lower surface portion.

The flat surface portion may perpendicularly extend from the light receiving portion toward the light emitting portion, and the lower surface portion may obliquely extend from the light receiving portion toward the light emitting portion.

A length of the light receiving portion between the flat surface portion and the lower surface portion may be less than a length of the light emitting portion between the flat surface portion and the lower surface portion, and a length of the flat surface portion from the light receiving portion to the light emitting portion may be greater than a length of the lower surface portion from the light receiving portion to the light emitting portion.

Each of the side surface portions may include: a first extending portion which widens from the light receiving portion toward the light emitting portion; and a second extending portion which extends from the first extending portion to the light emitting portion and perpendicularly extends from the light receiving portion.

The light emitting portion may obliquely extend from the flat surface portion toward the lower surface portion.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
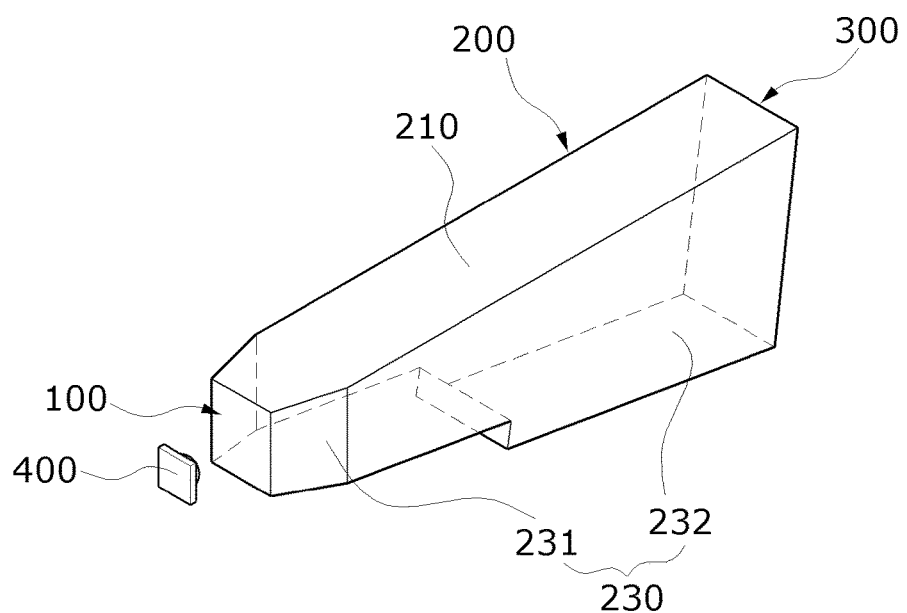
FIG. 1 is a perspective view illustrating a vehicle light guide unit according to one embodiment of the present invention.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. Like reference numerals in the drawings denote like elements.

It will be understood that for purposes of this disclosure, "at least one of X, Y, and Z" can be construed as X only, Y only, Z only, or any combination of two or more items X, Y, and Z (e.g., XYZ, XYY, YZ, ZZ). Unless particularly described to the contrary, the term "comprise", "configure", "have", or the like, which are described herein, will be understood to imply the inclusion of the stated components, and therefore should be construed as including other components, and not the exclusion of any other elements.

Figure 2:
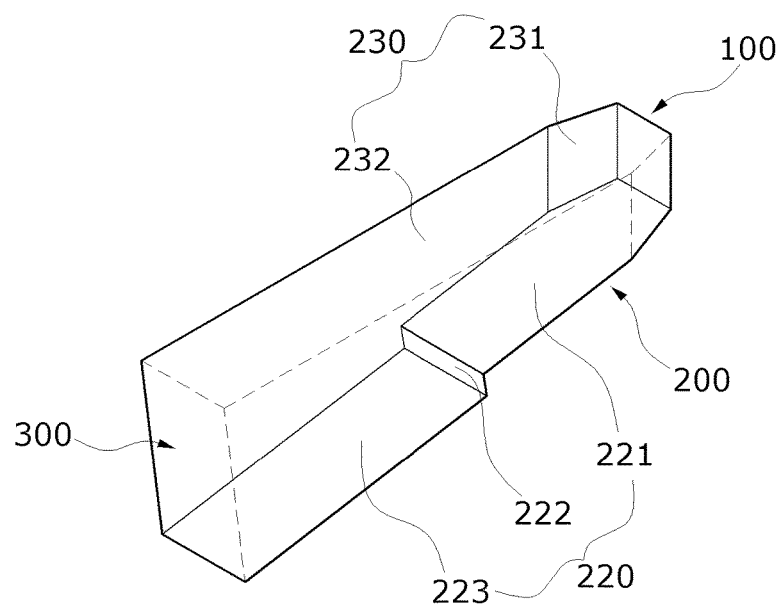
FIG. 2 is a perspective view illustrating a lower surface of the vehicle light guide unit illustrated in FIG. 1.
Figure 3:
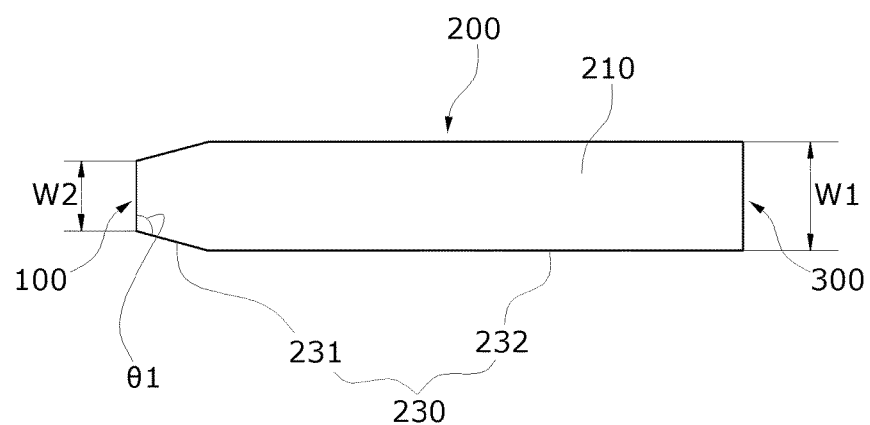
FIG. 3 is a side view illustrating a side surface of the vehicle light guide unit illustrated in FIG. 1.
Figure 4:
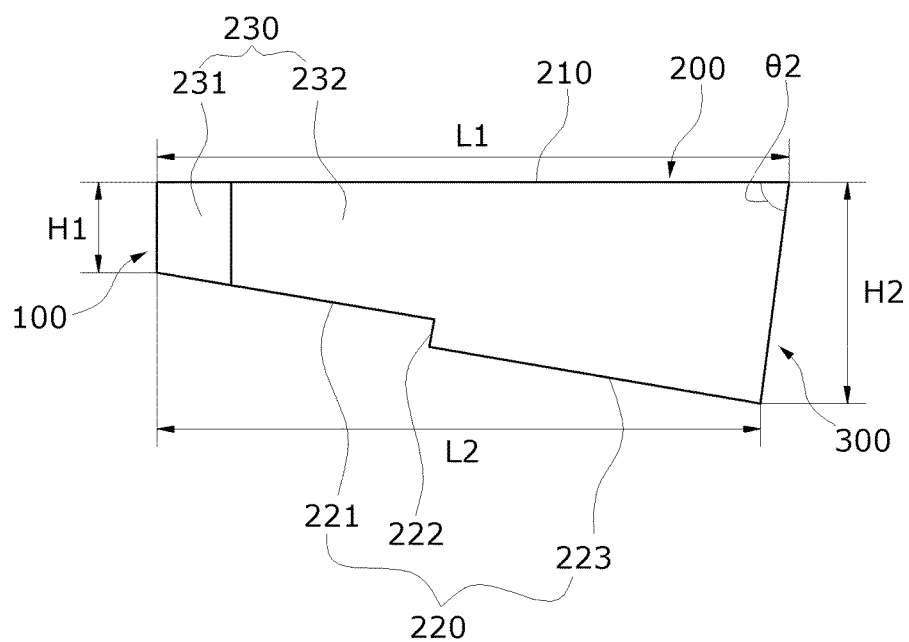
FIG. 4 is a plan view illustrating a plane surface of the vehicle light guide unit illustrated in FIG. 1.
Figure 5:
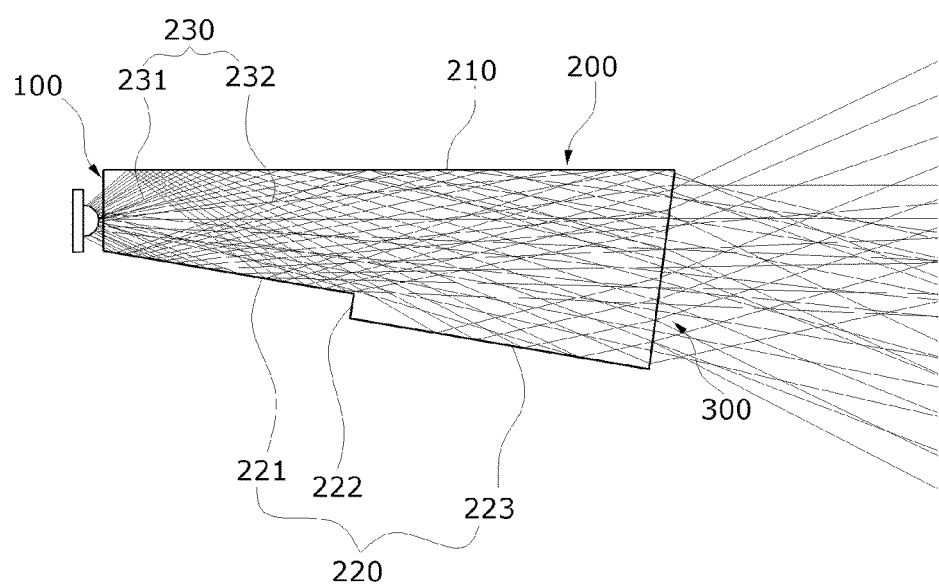
FIG. 5 is a side view illustrating a state in which light is totally reflected by the vehicle light guide unit according to one embodiment of the present invention.

FIG. 1 is a perspective view illustrating a vehicle light guide unit according to one embodiment of the present invention, FIG. 2 is a perspective view illustrating a lower surface of the vehicle light guide unit illustrated in FIG. 1, FIG. 3 is a side view illustrating a side surface of the vehicle light guide unit illustrated in FIG. 1, FIG. 4 is a plan view illustrating a plane surface of the vehicle light guide unit illustrated in FIG. 1, and FIG. 5 is a side view illustrating a state in which light is totally reflected by the vehicle light guide unit according to one embodiment of the present invention.

A light source 400, which will be described below, serves to emit light.

A semiconductor light emitting device such as a light emitting diode (LED), a laser diode (LD), and the like may be used as the light source 400 may use, and various kinds of light sources 400 may also be used as long as they emit light.

Referring to FIGS. 2 to 5, the vehicle light guide unit according to the present invention which projects the light emitted by the light source 400 to emit the light toward an aspheric lens includes a light receiving portion 100, a guide portion 200, and a light emitting portion 300.

The light receiving portion 100 is located on a line along which light is emitted by the light source 400, collects the light emitted by the light source 400, and refracts the light toward the guide portion 200.

The light receiving portion 100 may be formed with a flat-shaped or parabolic-shaped portion on which light is incident, and may be changed to any shape which collects light.

Meanwhile, the light receiving portion 100 is preferably disposed at a distance of 0.5 mm or less from the light source 400.

Accordingly, since the light emitted by the light source 400 may efficiently be made incident on the light receiving portion 100 and a distance between the light source 400 and the vehicle light guide unit is short, the vehicle light guide unit may even be efficiently disposed in a narrow space.

The guide portion 200 extends from the light receiving portion 100 toward the light emitting portion 300 and totally reflects incident light through the light receiving portion 100 to guide the light toward the light emitting portion 300.

Specifically, the guide portion 200 serves to guide light toward the light emitting portion 300 using total internal reflection of light which occurs at an interface between two materials having different media.

The guide portion 200 totally reflects light having an incidence angle which is greater than a set critical angle.

The above-described critical angle may vary according to a material of the light guide unit, and the light guide unit may be made of an acrylic material, glass, poly carbonate, or the like.

That is, the guide portion 200 may be made of a material through which light is transmitted.

Such a guide portion 200 includes a flat surface portion 210, a lower surface portion 220, and side surface portions 230.

The flat surface portion 210 extends from the light receiving portion 100 toward the light emitting portion 300 and perpendicularly extends from the light receiving portion 100 toward the light emitting portion 300.

The lower surface portion 220 is formed in an opposite direction of the flat surface portion 210 with respect to the light receiving portion 100 and the light emitting portion 300 and extends from the light receiving portion 100 toward the light emitting portion 300.

In addition, the lower surface portion 220 obliquely extends from the light receiving portion 100 toward the light emitting portion 300.

Such a lower surface portion 220 includes a first inclined portion 221, a stepped portion 222, and a second inclined portion 223.

The first inclined portion 221 obliquely extends from the light receiving portion 100 toward the light emitting portion 300.

Here, the first inclined portion 221 obliquely extends in the opposite direction of the flat surface portion 210 with respect to the light receiving portion 100 and the light emitting portion 300, that is, toward the outside.

The stepped portion 222 perpendicularly extends from an end portion of the first inclined portion 221 which is located at a side of the light emitting portion 300.

Here, the stepped portion 222 perpendicularly extends in the opposite direction of the flat surface portion 210, that is, toward the outside.

The second inclined portion 223 extends from an end portion of the stepped portion 222, which perpendicularly extends from the first inclined portion 221, toward the light emitting portion 300.

Here, it is preferable that the second inclined portion 223 obliquely extend in the opposite direction of the flat surface portion 210 with respect to the light receiving portion 100 and the light emitting portion 300, that is, toward the outside, and be inclined at the same angel as the first inclined portion 221.

Due to the above-described structure, the lower surface portion 220 is formed to have two steps.

Accordingly, since incident light through the light receiving portion 100 is totally reflected by the second inclined portion 223 disposed at an outer side compared to the first inclined portion 221 as illustrated in FIG. 5, the light may be uniformly guided to the light emitting portion 300 in a wider range.

Accordingly, since the lower surface portion 220 may increase intensity and efficiency of light, discriminability thereof can be improved, and thus lighting sensibility of the light source 400 can also be improved.

In addition, since intensity and efficiency of light are increased in the present invention, the light source 400 does not emit intense light unlike a conventional case in which the light source 400 emits intense light because intensity and efficiency of light thereof is decreased, and thus costs and power consumption can be decreased.

Meanwhile, although the lower surface portion 220 is described as being formed with the two steps, the lower surface portion 220 may also be formed with two or more steps by a plurality of stepped portions 222 and second inclined portions 223 alternately formed in a direction in which the lower surface portion 220 extends according to a kind or usage environment of a vehicle.

A pair of side surface portions 230 are formed to connect both side end portions of the flat surface portion 210 and both side end portions of the lower surface portion 220.

Each of the side surface portions 230 includes a first extending portion 231 and a second extending portion 232.

A pair of first extending portions 231 are formed in the side surface portions 230, and a width of the first extending portion 231 is increased from the light receiving portion 100 toward the light emitting portion 300.

The first extending portion 231 is preferably formed to have an inclination angle θ1 in a range of about 90° to 105° from the light receiving portion 100 as illustrated in FIG. 3.

Accordingly, a width W1 of the light emitting portion 300 may be adjusted according to the inclination angle θ1 between the light receiving portion 100 and the first extending portion 231.

In addition, in the light guide unit of the present invention, the light emitting portion 300 may be formed to have the width W1, which is narrower than that of a conventional light guide unit, without additionally decreasing a width W2 of the light receiving portion 100.

Accordingly, since the light emitted by the light source 400 may efficiently be made incident on the light receiving portion 100 and a light flux per unit area of the light emitting portion 300 is constantly maintained, light intensity thereof can be effectively maintained.

A pair of second extending portions 232 are formed in the side surface portions 230 and extend in parallel from the first extending portions 231 toward the light emitting portion 300.

Meanwhile, an irregular reflection layer or diffusion layer may be formed on an inner surface of the guide portion 200.

That is, when light is incident from the light source 400, the light may be guided toward the light emitting portion 300 in a state in which the light is irregularly reflected and uniformly diffused by the first inclined portion 221 and the second inclined portion 223.

In this case, brightness of light emitted through an aspheric lens may be totally uniformly distributed like light emitted by the surface light source 400.

Since the irregular reflection layer formed on the inner surface of the guide portion 200 may include repeated fine irregularities, and light is irregularly reflected by the fine irregularities, the light can have totally uniform brightness.

The light emitting portion 300 is formed in the opposite direction of the light receiving portion 100 with respect to the guide portion 200, and emits light guided by the guide portion 200 toward the aspheric lens.

The light emitting portion 300 is formed to have a cross section which is larger than that of the light receiving portion 100 so that incident light through the light receiving portion 100 can be easily emitted to the outside through the light emitting portion 300.

Meanwhile, as illustrated in FIG. 4, a height of the light receiving portion 100 from the flat surface portion 210 to the lower surface portion 220, that is, a height H1 of the light receiving portion 100, is less than a height of the light emitting portion 300 from the flat surface portion 210 to the lower surface portion 220, that is, a height H2 of the light emitting portion 300, and a length of the flat surface portion 210 from the light receiving portion 100 to the light emitting portion 300, that is, a length L1 of the flat surface portion 210, is greater than a length of the lower surface portion 220 from the light receiving portion 100 to the light emitting portion 300, that is, a length L2 of the lower surface portion 220.

That is, the light emitting portion 300 is formed to be inclined from the flat surface portion 210 toward the lower surface portion 220.

Accordingly, an area of the light emitting portion 300 may be increased depending on an inclination angle θ2 with respect to the flat surface portion 210, and the second extending portion 232 may accordingly compensate for a loss of area due to a decrease in the width W1 of the light emitting portion 300.

Meanwhile, the vehicle light guide unit according to the present invention is formed to have an overall length of 10 to 15 mm.

That is, the flat surface portion 210 is formed to have the length L1 in a range of about 10 to 15 mm.

Meanwhile, vehicle light guide units according to the present embodiment may also be disposed in a matrix shape.

Since the vehicle light guide units are disposed in the matrix shape, that is, a plurality of light guide units are horizontally and vertically disposed, a long distance or short distance view can be additionally secured.

In addition, lighting may be controlled vertically as well as horizontally so that the light can be emitted toward an object located in a specific direction.

For example, only the light source 400 disposed at the leftmost among the horizontally and vertically disposed light sources 400 may be turned on so that light can be emitted toward an object located at a corresponding to position.

To this end, a control part (not shown) of the light source 400 configured to control lighting of the light source 400 is formed, and the control part of the light source 400 may control lighting of the light source 400 to emit light toward only a specific location or not to emit the light toward only a specific location.

As describe above, in the vehicle light guide unit according to the present invention, since the lower surface portion 220 is formed to have two steps, incident light through the light receiving portion 100 is totally reflected by the second inclined portion 223 to be uniformly guided toward the light emitting portion 300 in a wider range, the lower surface portion 220 can accordingly increase intensity and efficiency of the light, and thus discriminability thereof can be improved.

In addition, since intensity and efficiency of light are increased in the present embodiment, the light source 400 does not emit intense light unlike a conventional case in which the light source 400 emits intense light due to a decrease in the intensity and efficiency of light, and thus costs and power consumption can be reduced.

Since the light receiving portion 100 is disposed at a distance of 0.5 mm or less from the light source 400, light emitted by the light source 400 can efficiently be made incident on the light receiving portion 100, and since a distance between the light source 400 and the vehicle light guide unit is short, the vehicle light guide unit can even be efficiently disposed in a narrow space.

Since the pair of first extending portions 231 are formed at end portions of both sides of the side surface portions 230 and widths thereof are increased from the light receiving portion 100 toward the light emitting portion 300, the width W1 of the light emitting portion 300 can be adjusted according to the inclination angle θ1 between the light receiving portion 100 and the first extending portion 231.

In addition, in the light guide unit of the present invention, since the light emitting portion 300 is formed to have the width W1, which is less than that of a conventional light guide unit, without additionally reducing the width W2 of the light receiving portion 100, the light emitted by the light source 400 can efficiently be made incident on the light receiving portion 100, a light flux per unit area of the light emitting portion 300 is constantly maintained, and thus light intensity thereof can be effectively maintained.

Since the light emitting portion 300 obliquely extends from the flat surface portion 210 toward the lower surface portion 220, the area thereof can be increased depending on the inclination angle θ2 between the flat surface portion 210 and the light emitting portion 300.

Since a lower surface portion of a light guide unit according to the present invention is formed to have two steps, incident light through a light receiving portion is totally reflected by a second inclined portion and is uniformly guided toward a light emitting portion in a wider range, and thus there are effects in that the lower surface portion can increase intensity and efficiency of the light and discriminability thereof can be improved.

In addition, since intensity and efficiency of light are increased in the present invention, a light source does not emit intense light unlike a conventional case in which intense light is emitted from a light source because light intensity and efficiency thereof are low, and thus there is an effect in that costs and power consumption are reduced.

Since a light receiving portion is disposed at a distance of 0.5 mm or less from a light source, light emitted by the light source can efficiently be made incident on the light receiving portion, and since a distance between the light source and a vehicle light guide unit is short, there is an effect in that the vehicle light guide unit can even be efficiently disposed in a narrow space.

Since a pair of first extending portions are formed at end portions of both sides of side surface portions and areas thereof are increased from a light receiving portion toward the light emitting portion, there is an effect in that a width of the light emitting portion can be adjusted according to an inclination angle of the first extending portion.

In addition, in the light guide unit of the present invention, since a width of a light emitting portion can be narrow in comparison to a width of a conventional light guide unit without additionally decreasing a width of a light receiving portion, there are effects in that light emitted by a light source can efficiently be made incident on the light receiving portion and light intensity thereof can be effectively maintained by constantly maintaining a light flux per unit is area of the light emitting portion.

Since a light emitting portion obliquely extends from a flat surface portion toward a lower surface portion, there is an effect in that an area thereof can be increased according to an inclination angle of the light emitting portion.

The present invention is not limited by the above-described embodiment, and may be variously modified in a technical range of the present invention and implemented by those of skilled in the art.

What is claimed is:

1. A vehicle light guide unit configured to project light emitted by a light source and emit the light toward an aspheric lens, the vehicle light guide unit comprising:
    a light receiving portion configured to refract incident light from the light source;
    a guide portion which extends from the light receiving portion and is configured to guide incident light through the light receiving portion; and
    a light emitting portion formed in an opposite direction of the light receiving portion with respect to the guide portion,
    wherein:
    the light guided by the guide portion is emitted toward the aspheric lens;
    a flat surface portion which extends from the light receiving portion toward the light emitting portion;
    a lower surface portion which is formed in an opposite direction of the flat surface portion with respect to the light receiving portion and the light emitting portion, and extends from the light receiving portion toward the light emitting portion; and
    the lower surface portion comprises:
        a first inclined portion which obliquely extends from the light receiving portion toward the light emitting portion;
        a stepped portion which perpendicularly extends from an end portion of the first inclined portion; and
        a second inclined portion which obliquely extends from an end portion of the stepped portion toward the light emitting portion.

2. The light guide unit of claim 1, wherein the guide portion further comprises side surface portions which connect end portions of both sides of the flat surface portion and end portions of both sides of the lower surface portion.

3. The light guide unit of claim 2, wherein each of the side surface portions comprises:
    a first extending portion which widens from the light receiving portion toward the light emitting portion; and a second extending portion which extends from the first extending portion to the light emitting portion and perpendicularly extends from the light receiving portion.

4. The light guide unit of claim 1, wherein:

the flat surface portion perpendicularly extends from the light receiving portion toward the light emitting portion; and the lower surface portion obliquely extends from the light receiving portion toward the light emitting portion.

5. A vehicle light guide unit configured to project light emitted by a light source and emit the light toward an aspheric lens, the vehicle light guide unit comprising:

a light receiving portion configured to refract incident light from the light source;

a guide portion which extends from the light receiving portion and is configured to guide incident light through the light receiving portion; and a light emitting portion formed in an opposite direction of the light receiving portion with respect to the guide portion, wherein:

the light guided by the guide portion is emitted toward the aspheric lens;

a flat surface portion which extends from the light receiving portion toward the light emitting portion;

a lower surface portion which is formed in an opposite direction of the flat surface portion with respect to the light receiving portion and the light emitting portion, and extends from the light receiving portion toward the light emitting portion;

a length of the light receiving portion between the flat surface portion and the lower surface portion is less than a length of the light emitting portion between the flat surface portion and the lower surface portion; and a length of the flat surface portion from the light receiving portion to the light emitting portion is greater than a length of the lower surface portion from the light receiving portion to the light emitting portion.

6. A vehicle light guide unit configured to project light emitted by a light source and emit the light toward an aspheric lens, the vehicle light guide unit comprising:

a light receiving portion configured to refract incident light from the light source;

a guide portion which extends from the light receiving portion and is configured to guide incident light through the light receiving portion; and a light emitting portion formed in an opposite direction of the light receiving portion with respect to the guide portion, wherein:

the light guided by the guide portion is emitted toward the aspheric lens;

a flat surface portion which extends from the light receiving portion toward the light emitting portion;

a lower surface portion which is formed in an opposite direction of the flat surface portion with respect to the light receiving portion and the light emitting portion, and extends from the light receiving portion toward the light emitting portion; and the light emitting portion obliquely extends from the flat surface portion toward the lower surface portion.

* * * * *